Oct. 18, 1960  M. M. ARLIN  2,956,378
MACHINE CONTROL
Filed April 29, 1957  10 Sheets-Sheet 1
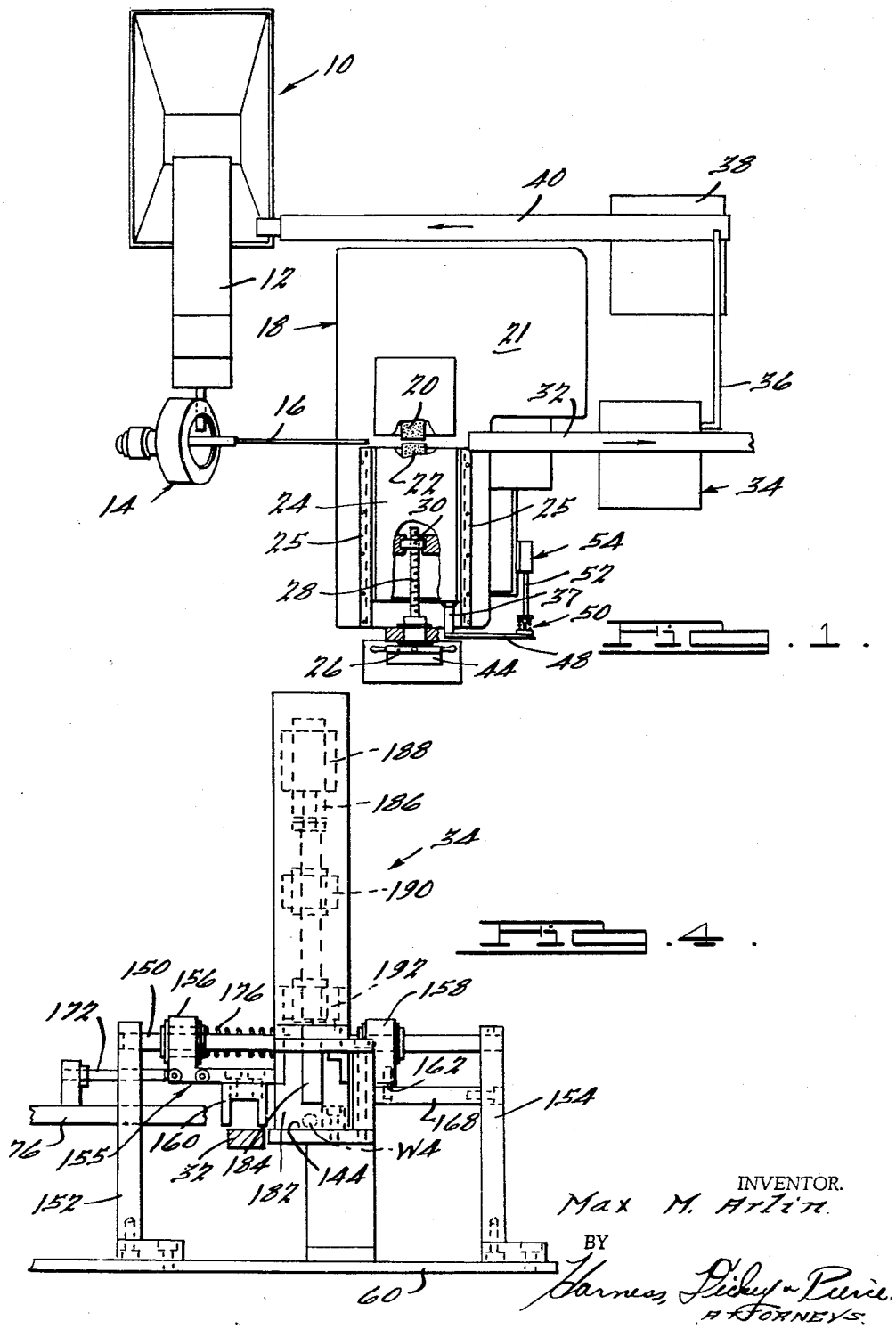
INVENTOR.
Max M. Arlin.
BY
Harness, Dickey & Pierce
ATTORNEYS.

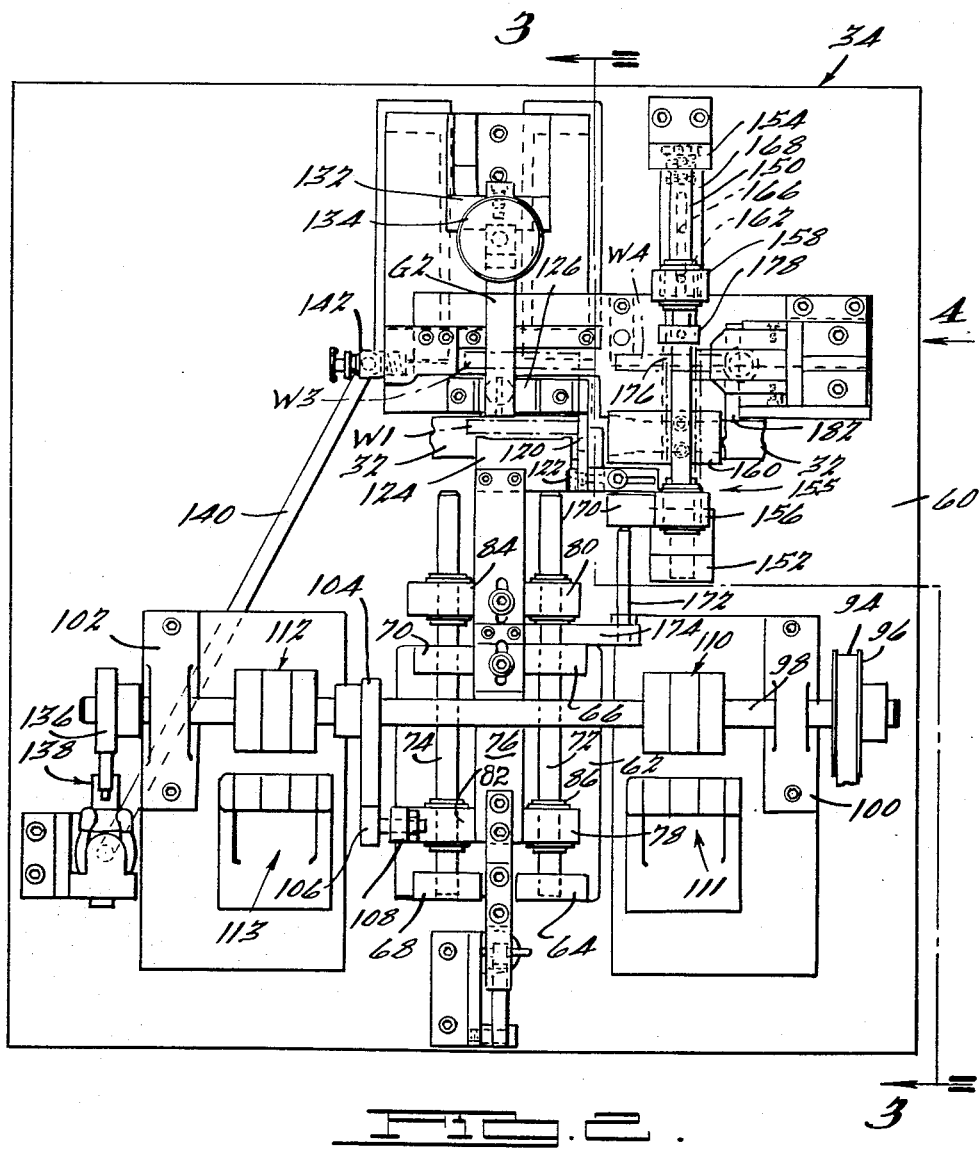

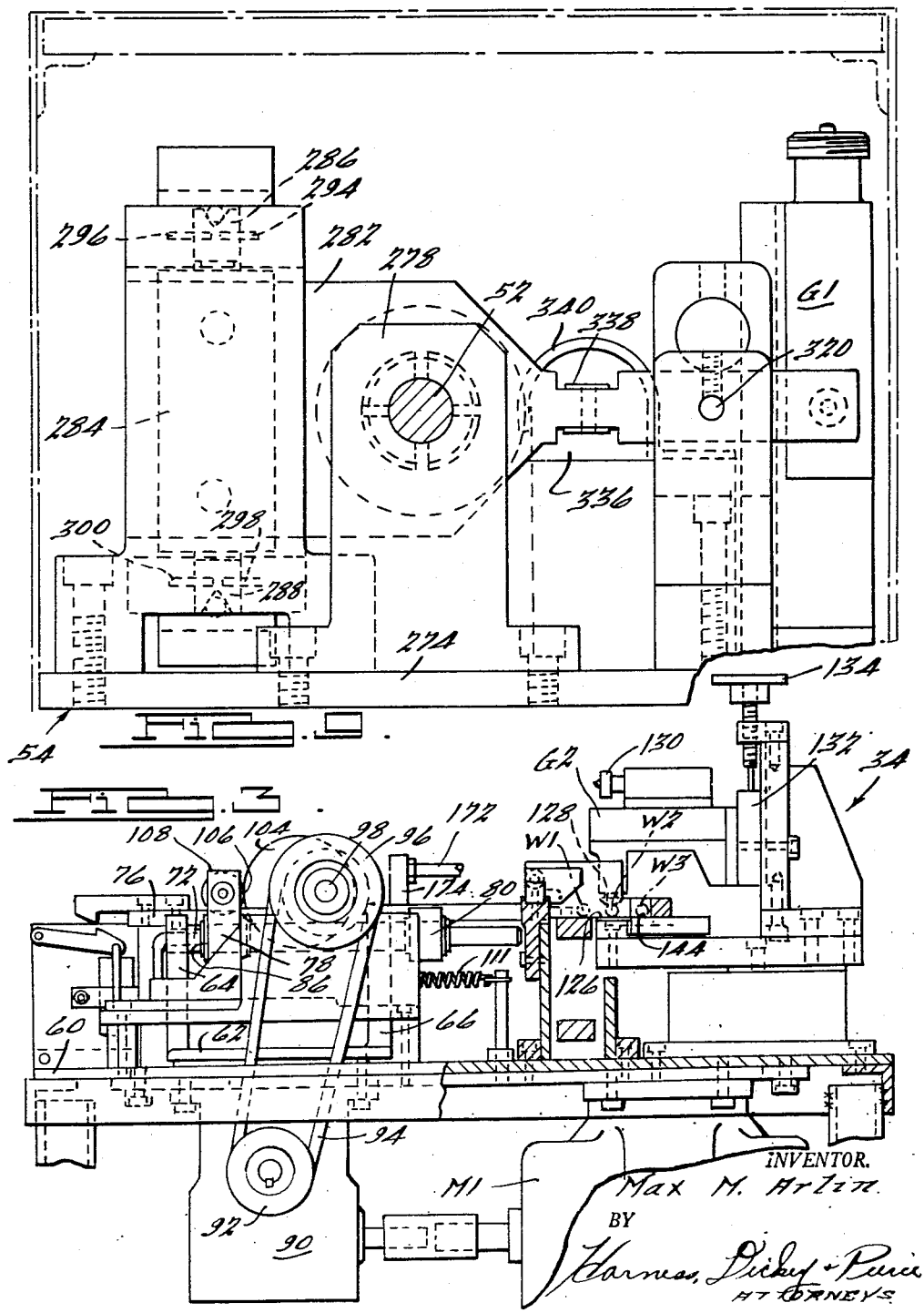

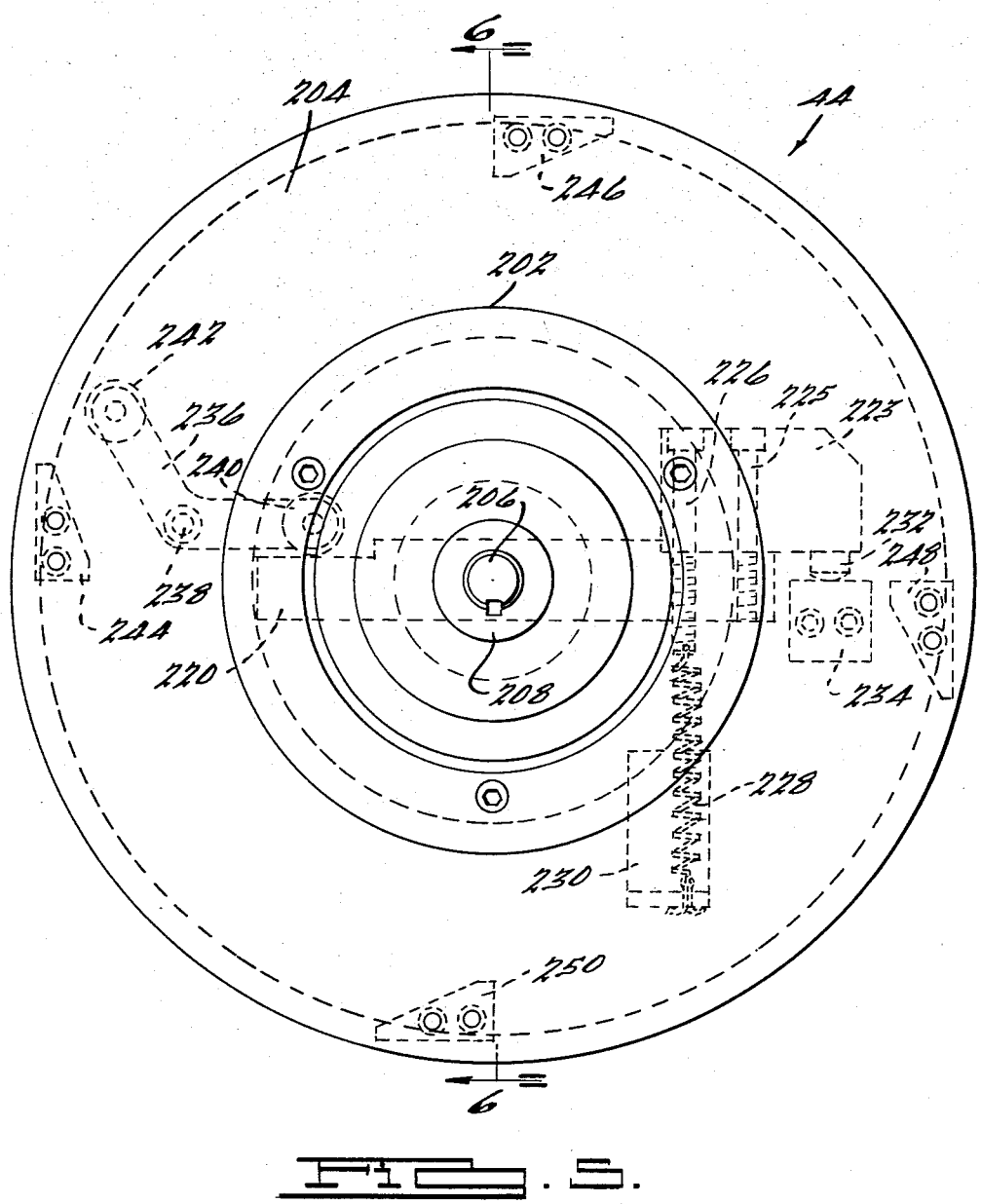

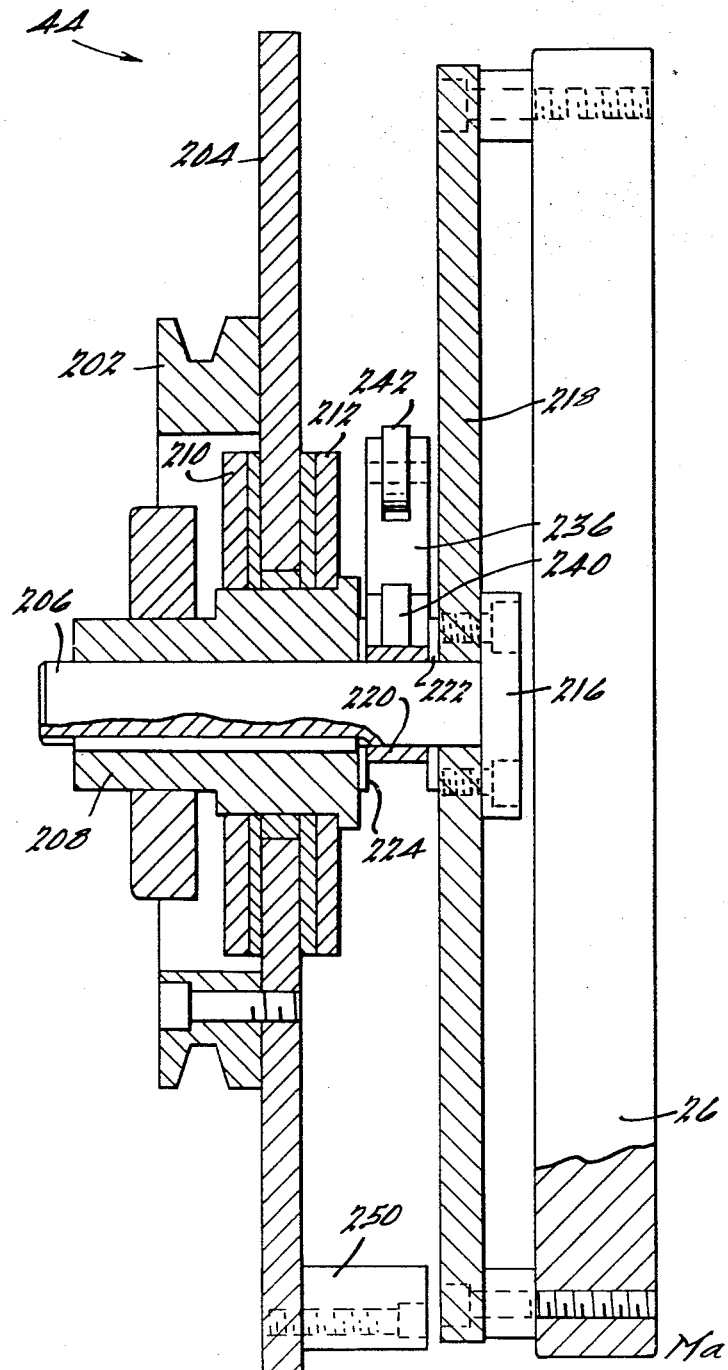

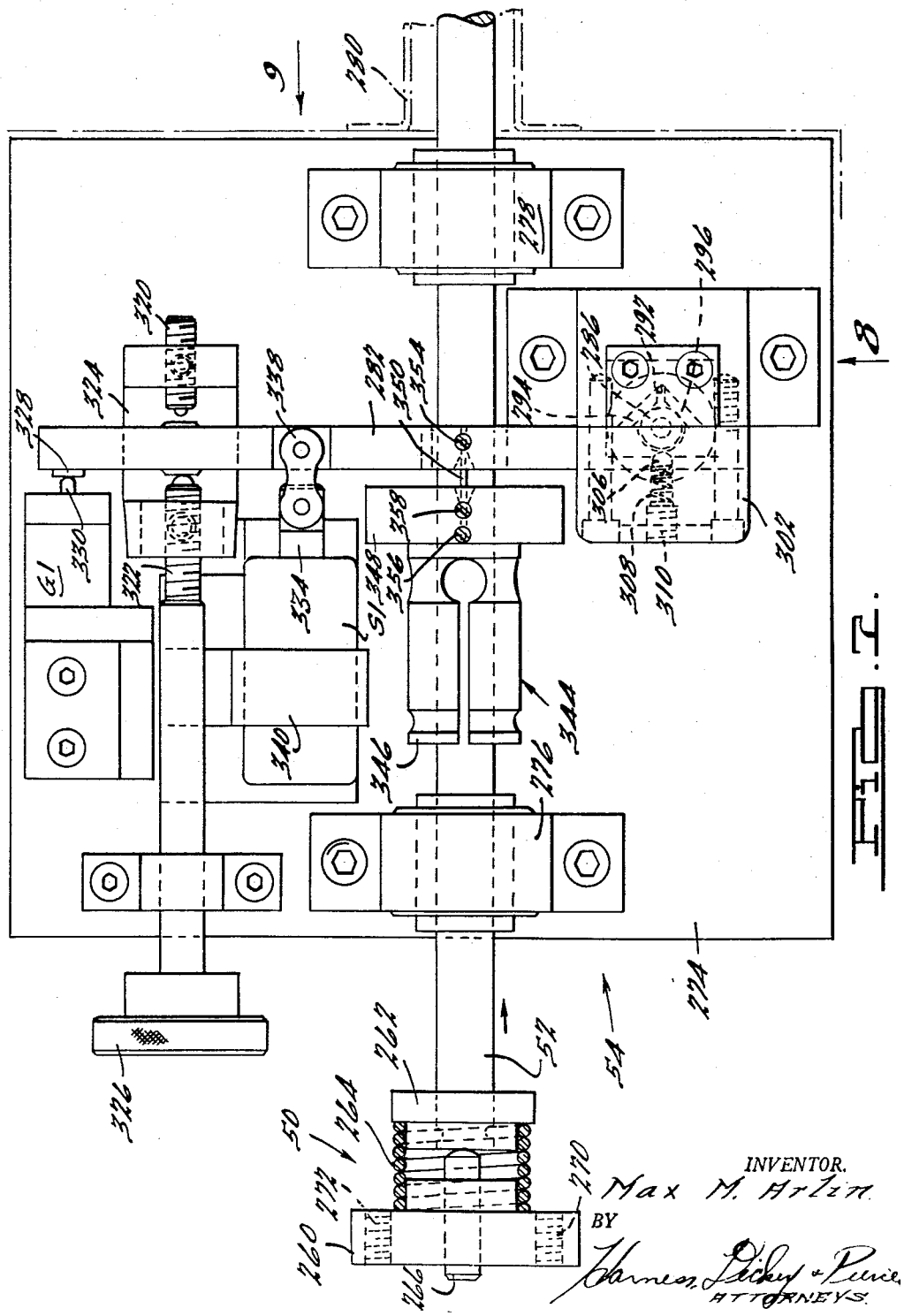

Oct. 18, 1960   M. M. ARLIN   2,956,378
MACHINE CONTROL
Filed April 29, 1957   10 Sheets-Sheet 7
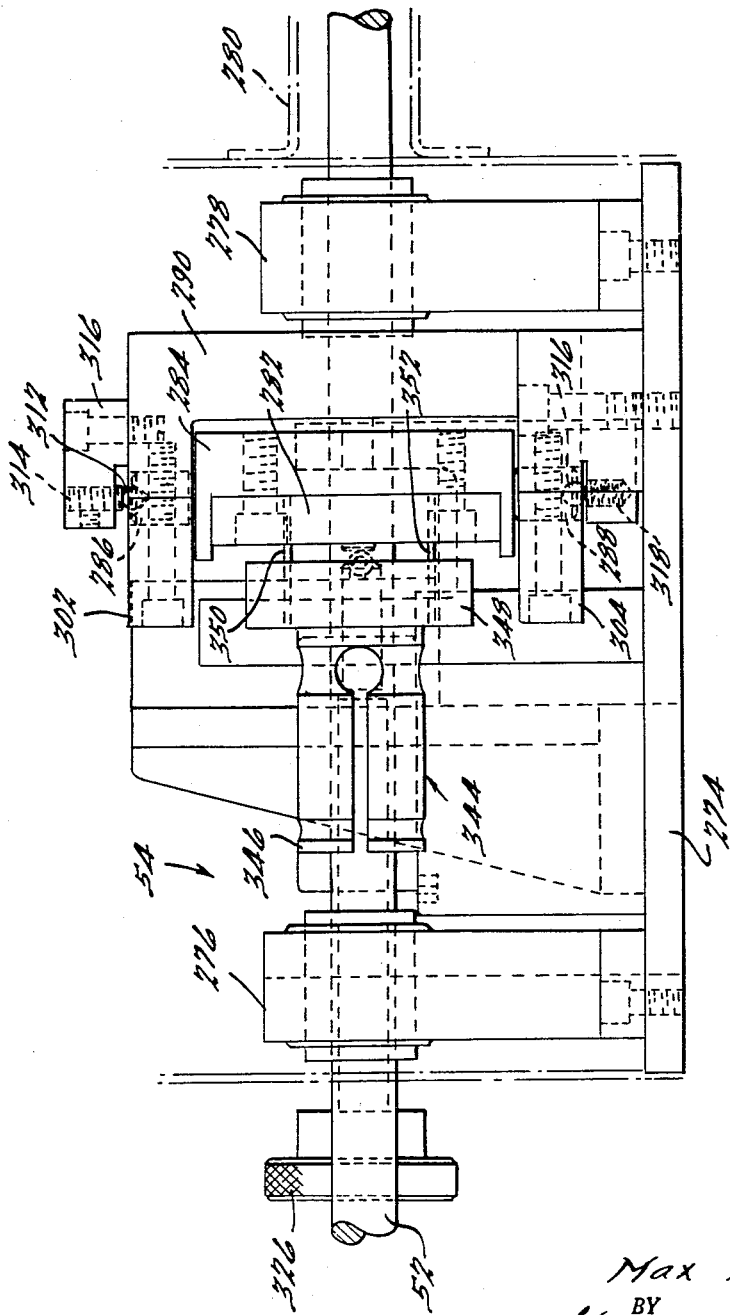
INVENTOR.
Max M. Arlin.
BY
Harness, Dickey & Pierce
ATTORNEYS

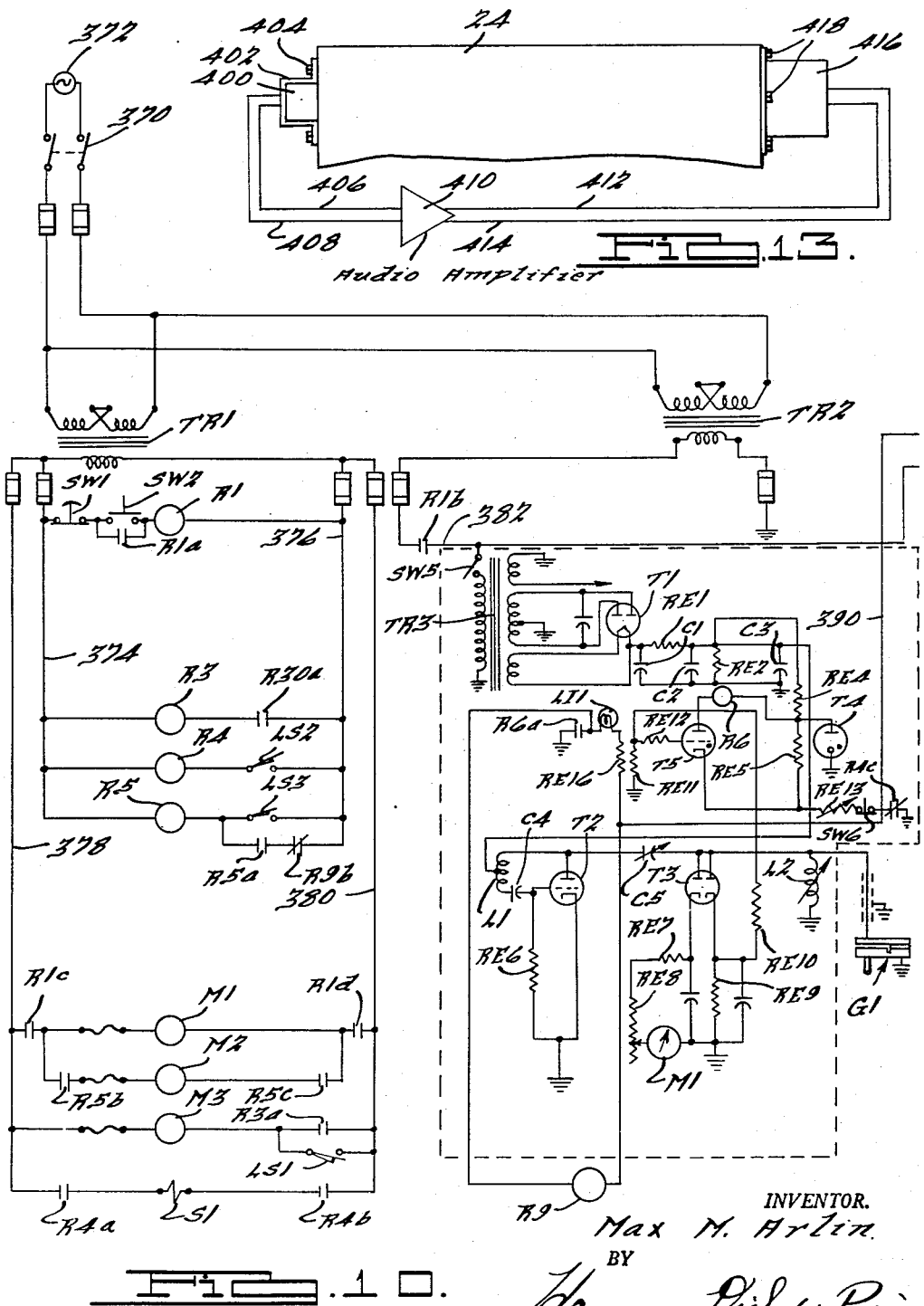

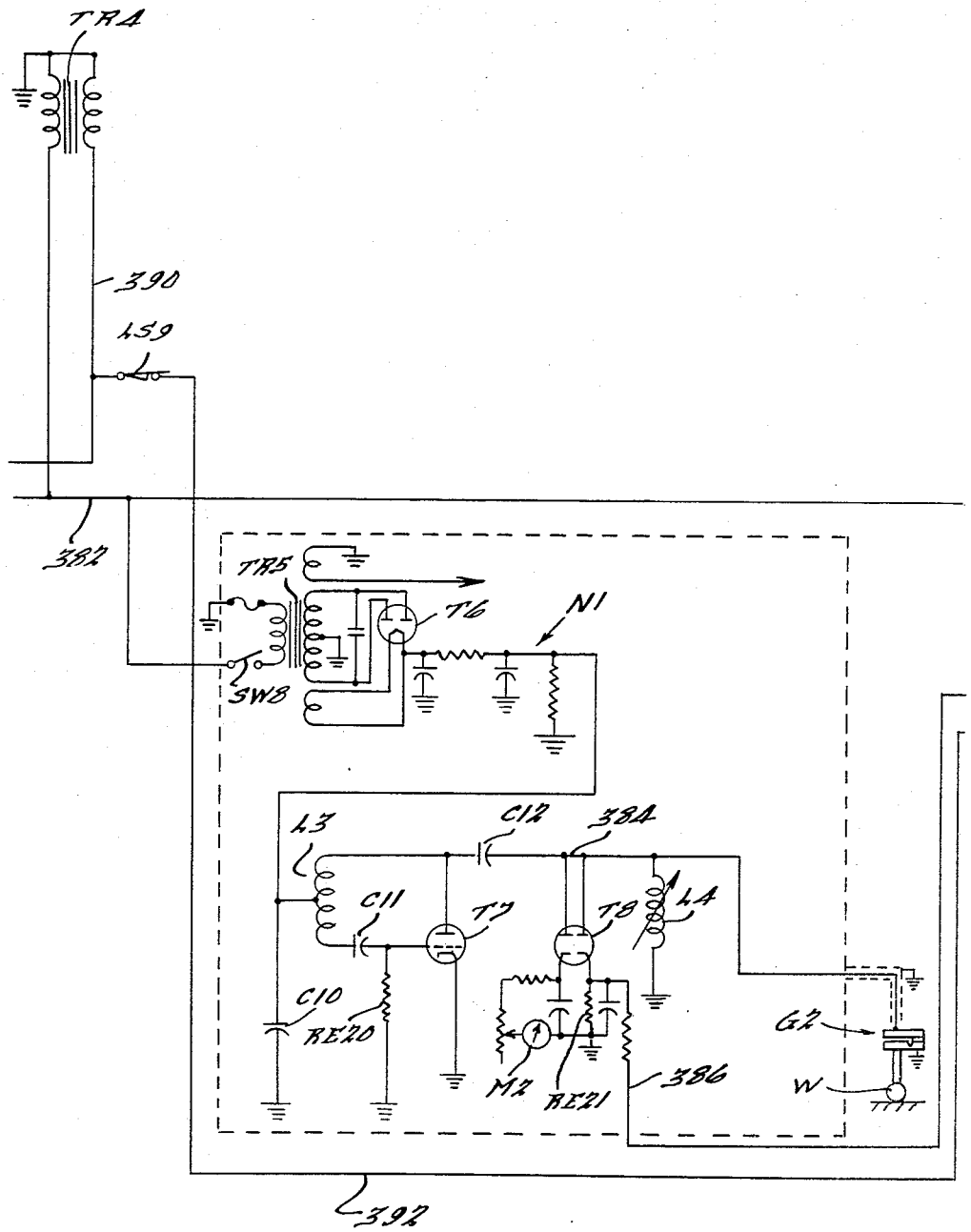

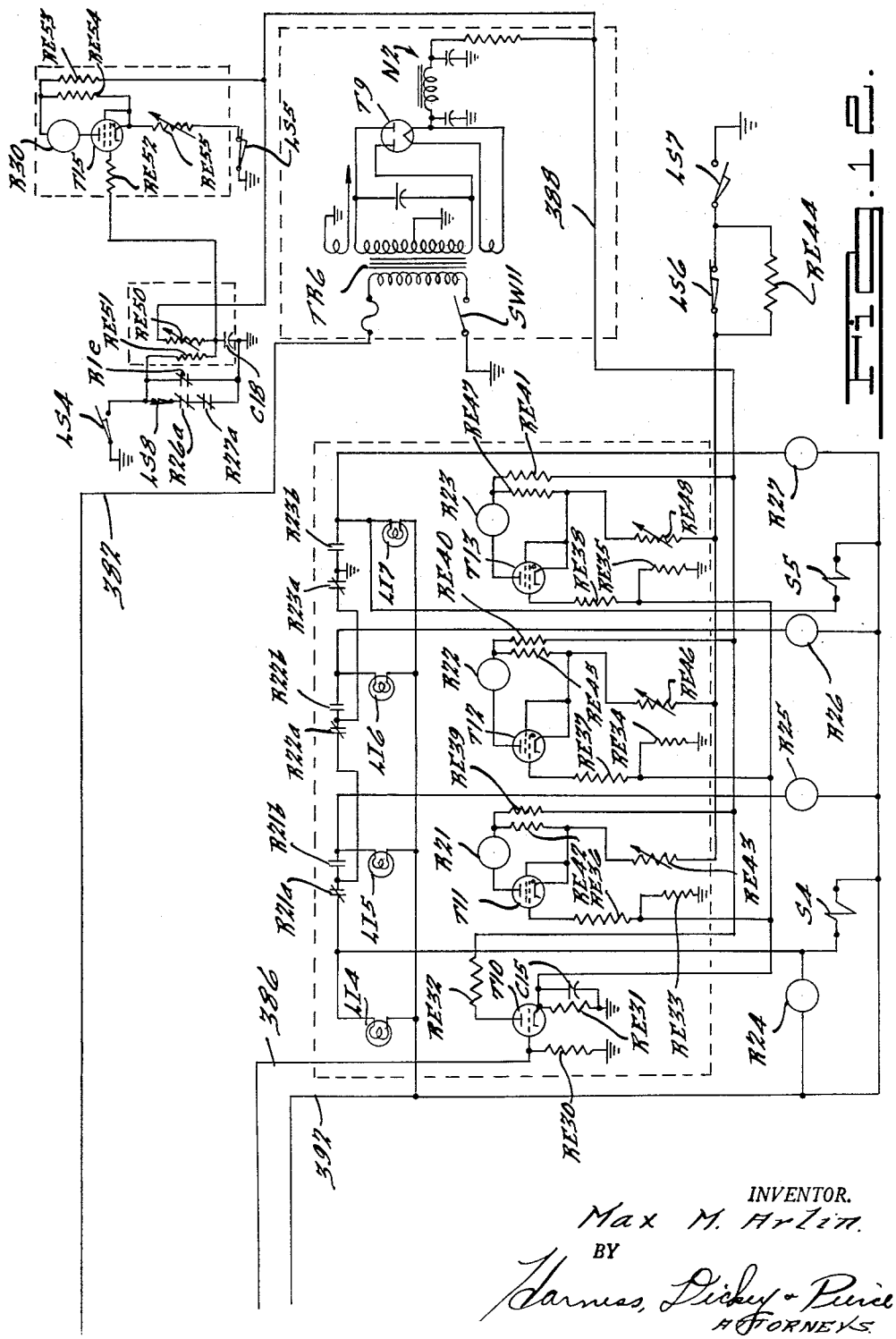

United States Patent Office 2,956,378
Patented Oct. 18, 1960

2,956,378

MACHINE CONTROL

Max M. Arlin, Detroit, Mich., assignor to John D. MacArthur, Chicago, Ill.

Filed Apr. 29, 1957, Ser. No. 655,549

21 Claims. (Cl. 51—165)

This invention relates to mechanisms for controlling the operation of an automatic machine.

An object of the present invention is to provide an improved means for automatically maintaining a cutting machine in proper adjustment.

Another object of the present invention is to adjust a cutting tool in a series of fixed incremental movements.

Another object of the invention is to initiate movement of an adjusting slide in response to the deviation of one or more workpieces from proper size, and to terminate that movement when the slide has moved a preselected distance.

Another object of the invention is to provide an improved means for precisely moving one element of a machine relative to another, including the application thereto of a force having a relatively steady component and a regularly varying component.

A further feature of the invention is to reduce the effects of static friction between relatively movable parts by vibrating one or both of those parts.

Another object of the invention is to provide an improved means for vibrating a machine element at a frequency having a relationship to the natural frequency of vibration of that element.

Another object of the invention is to provide an improved gauging mechanism for determining the extent of physical movement of a machine element and having the capability of measuring the extent of each of a plurality of incremental movements of that machine element.

The manner of accomplishing the foregoing objects, and other objects and features of the invention, will become apparent from the following detailed description of an embodiment of the invention when read with reference to the accompanying drawings in which:

Fig. 1 is a schematic representation of equipment embodying certain of the principles of the invention and shown in association with a conventional grinding machine;

Fig. 2 is a plan view of an inspection unit which can constitute one of the elements of the equipment represented in Fig. 1;

Fig. 3 is a sectional view taken substantially along the line 3—3 of Fig. 2;

Fig. 4 is a fragmentary end elevation of the structure shown in Fig. 2, being taken in the direction of the arrow 4 in Fig. 2;

Fig. 5 is an elevational view of an indexing means embodying certain of the principles of the present invention and which can constitute another of the elements of the equipment represented in Fig. 1;

Fig. 6 is a sectional view taken substantially along the line 6—6 of Fig. 5;

Fig. 7 is a plan view of a control mechanism embodying certain of the principles of the present invention and which can constitute another of the elements of the equipment represented in Fig. 1;

Fig. 8 is a side elevational view of the structure shown in Fig. 7, being taken in the direction of the arrow 8 on Fig. 7;

Fig. 9 is a rear elevational view of the structure shown in Fig. 7, being taken in the direction of the arrow 9 on Fig. 7;

Fig. 10 is a schematic representation of a portion of suitable circuitry constituting a part of the control equipment in Fig. 1;

Fig. 11 is a schematic representation of another portion of suitable circuitry, being placed to the right of Fig. 10;

Fig. 12 is a schematic representation of another portion of suitable circuitry, being placed to the right of Fig. 11; and Fig. 13 is a schematic representation of a resonator assembly for producing vibrational movement of the slide of the machine shown in Fig. 1.

Referring first to the schematic representation of Fig. 1, workpieces which have been loaded into a hopper 10 are transported by an elevator 12 to a rotary-type orientation hopper 14 from which they are supplied by means of a conveyor or chute 16 to the machine 18. While the principles of the invention are applicable to screw machines, lathes, milling machines, and other such machines, they are representatively disclosed in Fig. 1 of the drawings in association with a centerless grinder of a conventional type. In the generalized representation of Fig. 1, grinder 18 is assumed to include a pair of grinding wheels 20 and 22 both mounted for rotation about their longitudinal axes. Grinding wheel 20 is assumed to be effectively fixed against translational motion relative to the base 21 during operation, while grinding wheel 22 is supported by appropriate bearing means upon a slide or positioning means 24 which is movable upon ways 25 in a direction to move grinding wheel 22 towards or away from grinding wheel 20. An infeed wheel 26 is adapted to drive worm 28 which engages a nut 30 secured to the slide 24 so as to drive the slide or positioning means 24 relative to the base 21 and hence to adjust the position of grinding wheel 22 relative to grinding wheel 20.

The workpieces which are fed into the machine 18 pass between the grinding wheels 20 and 22 and are advanced to a conveyor 32 by means of which they are carried to an inspection unit 34. In the illustrated arrangement, the inspection unit 34 is adapted and designed to measure the diameter of the workpieces to determine whether they are correct, undersized, or oversized. In the disclosed arrangement, the proper sized workpieces are permitted to continue along conveyor 32, while the oversized workpieces are passed to an oversized return chute 36 by means of which they are carried to a floor hopper 38 and via the output conveyor 40 of the hopper 38 back to the hopper 10 for recirculation.

If machine 18 is standing alone, it will also be desirable to segregate the undersized workpieces into a reject bin. However, it is assumed in the representation of Fig. 1 that conveyor 32 extends to a second machine similar to machine 18 in which a finish grinding operation is performed. Since workpieces which are undersized after initial grinding may in fact not be smaller in diameter than workpieces which have received their finish grind, it is feasible to defer final rejection of the undersized workpieces until the finish grind is complete, both the undersized and the proper sized workpieces being delivered to the conveyor 32 by inspection unit 34.

Except where there is faulty initial setup or some malfunctioning, it is not likely that undersized parts will occur in any substantial quantity since the primary variation which occurs with successive workpieces is in the wearing of the grinding wheels 20 and 22, that wear tending to produce oversized rather than undersized workpieces. The inspection unit 34 is adapted to initiate the correcting of the position of the grinding wheel 22 whenever the sensed workpieces are oversized by a preselected amount. A number of considerations will enter into the determination of the magnitude of that amount including the tolerances which are permitted in the ground workpieces, the accuracy of gauging, and the frequency of adjustment. With properly designed gauging equipment, this preselected amount may be vary small, approaching one millionth of an inch. Normally, however, the oversized error which will trigger a correction cycle is somewhat larger than this.

As will be seen, means are also desirably provided to insure that a correction cycle is not initiated improperly, such as, as a result of an imperfect workpiece being gauged. In this disclosed arrangement, this is accomplished as a condition precedent to the initiation of a correction cycle the determination that two or more successive workpieces are oversized by more than the preselected amount. When this condition occurs, means are energized to advance the slide 24 in a direction to move the grinding wheel 22 towards the grinding wheel 20. This mechanism is representatively in the form of an indexing means 44 connected to the wheel 26. As will be seen, indexing means 44 serves, when energized, to exert a continuing and relatively steady torque upon wheel 26 of a magnitude slightly less than that required to rotate the wheel, with means being intermittently effective to bring this force magnitude above the critical value so that the wheel 26 is, in effect, rotated by tapping.

While this tapping method, coupled with vibration of the machine as a whole as will be discussed, satisfactorily produces motion of the slide 24 in minute increments, the extent of rotation of the infeed wheel 26 does not necessarily accurately reflect the extent of movement of slide 24 as a result of certain variables including irregularities in the slide and ways and varying windup of the lead screw or worm 28. Consequently, means are provided for sensing the physical location of the slide 24 itself. In accordance with the principles of the invention, the slide 24, in response to the initiation of a correction cycle, will be moved forwardly a preselected fixed distance. This increment, with any given manual adjustment of the equipment, is independent of the extent to which the sensed workpieces are oversized. Again, plural factors will enter into the determination of the optimum distance of forward motion during any one correction cycle, including the rate of travel of the workpieces, the rate of wear of the grinding wheels 20 and 22, the workpiece tolerances and the magnitude of the size deviation which which will initiate the correction cycles. In a practical arrangement, this distance may be in the range of five to thirty millionths of an inch or may, if desired, the appreciably greater.

The means for sensing the position of the slide 24 is illustrated as including a bracket 37 firmly secured to the slide 24 and movable therewith and firmly secured to or integral with a laterally extending rigid arm 48. Arm 48 is connected by means of a coupling device 50 to a rod 52 which is a part of a sensing control mechanism 54, rod 52 being moved with slide 24 and serving to actuate mechanism in the control 54 whenever the rod 52 has moved the preselected distance. At the termination of this movement, the indexing means 44 is deenergized so that the slide 24 is brought to rest. Slide 24 will remain at rest until the next correction cycle is initiated as a result of a signal from the inspection unit 34.

A representative form of inspection unit 34 is represented in Figs. 2 to 4 of the drawings, although it will be appreciated that other forms of inspection machines capable of performing similar functions can also be used in the combination disclosed in Fig. 1.

The unit 34 comprises a base plate 60 to which a bracket 62 is secured. Bracket 62 includes four upstanding arms 64, 66, 68 and 70, the former two of which are provided with aligned apertures accepting and rigidly supporting a rod 72 and the latter two of which similarly support rod 74. A slide 76 is provided with four laterally extending ears 78, 80, 82 and 84, each of which is centrally apertured to accept a sleeve such as sleeve 86 associated with ear 78. Ears 78 and 80 cooperate with rod 72 while ears 82 and 84 cooperate with rod 74 so that slide 76 is supported for movement in translation relative to those rods and along a line parallel with the longitudinal axes of those rods.

This movement in translation is imparted to slide 76 through a mechanism including a motor M1 (Fig. 3), gear reduction unit 90, pulley 92, belt 94, pulley 96, shaft 98 supported by bearings 100 and 102 (Fig. 2), eccentric cam 104 keyed to shaft 98, and cam follower roller 106 which is rotatably supported by a bracket 108 secured to the slide 76. It will be observed that shaft 98 also carries a plurality of cams generally designated 110 and 112 cooperating with individual limit switches 111 and 113 which form a part of the electrical circuitry to be described. Appropriate means are provided for continuously urging the slide 76 forwardly so as to urge the cam follower roller 106 continuously into engagement with the cam 104, this means representatively taking the form of a spring 111 (Fig. 3) one end of which is effectively anchored with respect to the base 60 and the other end of which is connected to the slide 76 or parts movable therewith.

The inspection unit 34 is placed into use by moving a blade 120 (Fig. 2) about a pivotal axis defined by a screw 122 to a horizontal position in which its undersurface is proximate the upper surface of the conveyor 32. As a result, each succeeding workpiece W, illustratively shown as a circular cylindrical member, is traveled along the conveyor 32 until it strikes stop 120, then occupying the position illustrated at W1 in Fig. 2. During 180 degrees of rotation of cam 104, slide 76 is moved forwardly so that plate 124 carried thereby engages a workpiece in position W1 and moves it transversely of its own longitudinal axis to a position illustrated at W3. During this travel, the workpiece will move across a gauging surface 126 and will transiently lie in the position W2 as illustrated in Fig. 3 of the drawings. It is in this position that the workpiece diameter is gauged by gauge G2 which includes a movable sensing finger 128 engageable with the workpiece. Gauge G2 may be of any suitable type although it is preferred that it be of the type which will produce an electrical output signal some characteristic of which varies in accordance with the position of sensing finger 128, the electrical output being taken from a connector 130. A suitable form of gauge is disclosed in my Patent 2,635,748 granted April 21, 1953.

Gauge G2 is mounted upon a slide 132 so that its vertical position may be selected by rotation of adjusting knob 134 to adjust the initial relationship between the sensing finger 128 and the gauging surface 126, this setting being made in the light of the nominal workpiece diameter.

At the maximum throw of the slide 76, the workpiece is deposited in position illustrated at W3 in Figs. 2 and 3 of the drawings at which point in the cycle of movement cam 136 (Fig. 2) actuates a valve 138 which results in the production of a momentary blast of air through the tube 140 and out the nozzle 142, this blast forcing the workpiece to move to the right in the view of Fig. 2, traveling over the surface 144.

The extent of the movement of the workpiece in response to this air blast is controlled by a segregator mechanism which is supported by the base plate 60 and which is in part actuated by the slide 76. A rod 150 (Figs. 2 and 4), lying in spaced parallelism with rods 72 and 74, is supported by means of uprights 152 and 154 in a position to the right of the gauge G2 in the view of Fig. 2. Rod 150 supports a slide assembly 155 including interjoined space-apart apertured members 156 and 158, which slidably engage rod 150, and a channel 160. In the illustrated arrangement, channel 160 is maintained in its proper horizontal orientation by means of a pin 162 secured to member 158 and slidably engaging an elongated slot 166 (Fig. 2) in a rod 168 extending in underlying parallelism with rod 150 and supported by upright 154 (Fig. 4). Slide assembly 155 also includes an offset portion 170 (Fig. 2) which engages a rod 172 secured by means of a bracket 174 to the slide 76, a spring 176 acting between a sleeve 178 secured to rod 150 and the forward surface of member 156 serving to maintain the segregator slide offset portion 170 in engagement with the rod 172. Consequently, when slide 76 is at full stroke, having moved the workpiece to the position W3, channel 160 is moved into alignment with the workpiece in the position W3, that is, when the workpiece is moved to position W4 by the air blast, the workpiece will be positioned within the channel 160.

Whether the workpiece continues to move to the right in the view of Fig. 2 through the channel 160 and into a reject bin or to an oversize return chute, such as chute 36 (Fig. 1) or whether the workpiece is returned to the conveyor 32 is determined by the position of a plate 182 which is secured to the end of a rod 184 (Fig. 4). Rod 184 is secured to the core 186 of a solenoid 188, and is guided by means of bearings 190 and 192. If solenoid 188 is energized, its core 186 is drawn upwardly, moving the rod and plate 182 upwardly to a position spaced above the surface 144. Under this condition, the blast of air through nozzle 142 will move the workpiece from the position W3 through the position W4 and to the reject bin or return chute. However, if solenoid 188 is released so that plate 182 is lowered to a position adjacent surface 144, the blast of air from nozzle 142 will force the workpiece from position W3 to position W4 where it will stop. When slide 76 is withdrawn during the last portion of the rotational motion of cam 104, channel 160 will move correspondingly, forcing the workpiece to move from the position W4 to a position upon the conveyor 32. Since the conveyor 32 is actuated, the workpiece will be carried thereby to the next stage in its processing. As will be seen, the condition of solenoid 188 is controlled by electrical circuitry which is in turn controlled by the gauge G2.

When the gauge G2 detects that a workpiece is oversize by more than the preselected amount, control equipment is actuated to energize the indexing assembly 44 (Fig. 1) to produce rotation of the machine control or infeed wheel 26. The details of a suitable indexing assembly are illustrated in Figs. 5 and 6 of the drawings.

The assembly illustrated in Figs. 5 and 6 is driven by a motor through a V-belt (not shown) which is trained over a pulley 202. Pulley 202 is screwed or otherwise secured to a circular driver plate 204. Rotation of driver plate 204 results in the production of a torque tending to rotate shaft 206. Plate 204 is connected with shaft 206 through an appropriate friction clutch or torque limiting assembly of a commercially available type and diagrammatically illustrated as comprising a hub 208 keyed to shaft 206 and elements 210 and 212 engaging opposing faces of driver plate 204. Any appropriate form of such drive coupling may be employed and it is contemplated for example, that an electromagnetic or eddy-current clutch may be employed to couple the pulley 202 to the shaft 206 with, if desired, the current to the energizing coil being increased with time after energization of the driving motor so as to compensate for sticking of the parts.

The friction clutch is adjusted so that a relatively steady torque is applied to shaft 206 which is smaller in magnitude than the torque which is required to rotate the wheel 26. For example, if it is found with any given machine, such as the illustrated grinder, that the application of a torque of 30-inch pounds will normally produce movement of the wheel 26, then the friction clutch may be set, for example, so that a continuing torque is applied to shaft 206 in the order of 20- to 25-inch pounds whenever the driving motor is energized. By virtue of the application of this continuing torque, the wheel 26 may be rotated through minute increments by the additional application of relatively low torque impacts. That is, wheel 26 may be rotated in small increments and the slide precisely advanced by repetitively tapping the wheel with a force the magnitude of which is sufficient when coupled with the continuously applied torque to overcome the static friction of the wheel 26 and of the parts driven thereby. A preferred mechanism is disclosed for applying these repeated, abrupt impact forces.

Shaft 206 terminates in a flange 216 which is screwed or otherwise secured to a circular anvil plate 218 which is in turn secured to the infeed wheel 26. A hammer arm 220 is rotatably disposed upon the shaft 206 intermediate the anvil plate 218 and the face of the hub 208, being spaced therefrom by washers 222 and 224 respectively. A hammer head 223 (Fig. 5) is secured to one end of the hammer arm 220 by means of machine screws 225 and 226, the latter of which is apertured to accept one end of a spring 228 the other end of which is anchored to a spring holder 230 screwed or otherwise secured to the anvil plate 218. A hammer 232 is secured to the hammer head 223 and is engageable with an anvil 234 which is screwed or otherwise secured to the face of the anvil plate 218. Since hammer arm 220 is rotatable with respect to shaft 206, spring 228 will tend to maintain hammer 232 in engagement with anvil 234.

A bell crank rocker arm 236 is pivotally secured at 238 to the anvil plate 218 and carries at its two ends rollers 240 and 242. Roller 240 is adapted to engage a surface of the hammer arm 220, as may best be seen in Fig. 5 of the drawings, while roller 242 is adapted to engage each of a plurality of cam lugs 244, 246, 248 and 250 which are screwed or otherwise secured to the driver plate 204, representatively and desirably at equally spaced increments.

Since the continuing torque applied by driver plate 204 through shaft 206 and anvil plate 218 to wheel 26 is less than that required to produce rotation of wheel 26, plate 218 tends to remain stationary while plate 204 rotates. As a result, the lugs 244 to 250 travel clockwise in the view of Fig. 5 relative to the rocker arm 236. As each such lug engages the roller 242, rocker arm 236 is pivoted to produce counterclockwise rotation of hammer arm 220 against the restoring force of spring 228, producing a separation of the hammer 232 from the anvil 234. When roller 242 abruptly moves off of the end of the camming surface of the individual lug 244 to 250, hammer arm 220 is released and spring 228 forces hammer 232 into impact engagement with anvil 234. The parts are constructed so that the resultant tapping produces a sufficient force to move the wheel 26 incrementally in a clockwise direction, in the illustrated arrangement, advancing the slide and the movable grinding wheel. It has been found in practice that precise and exact control of the movement of the grinding wheel can be accomplished in this fashion.

As will be described hereinafter, improved control of the slide movement can be attained by employing a vibrator or resonator in conjunction with the described indexing means.

The indexing mechanism 44 (Fig. 1) continues to operate repetitively, tapping the wheel 26 to move the movable grinding wheel until the unit 54 signals that the slide 24 which supports the grinding wheel has moved forwardly a preselected distance. As before indicated, the movement of slide 24 is sensed through the medium of an arm 48, with arm 48 in turn being coupled to the shaft 52 of unit 54 through coupling means 50.

As may best be seen in Fig. 7, coupling 50 comprises a pair of spaced-apart spring collars 260 and 262 interjoined by a spring 264. Collar 262 is secured to the end of shaft 52 while collar 260 is centrally apertured to accept a pin 266 one end of which abuts the end of shaft 52 and the other end of which is adapted to be brought into abutment with the arm 48 (Fig. 1), spring collar 260 being secured to arm 48 by any appropriate means, such as by machine screws engaging the tapped apertures 270 and 272.

In the control unit illustrated in Figs. 7 to 9, shaft 52 is supported relative to base plate 274 by means of bearing blocks 276 and 278. The projecting end of the shaft 52 may be protected by means of an end cover 280 if desired.

Shaft 52 passes freely through an enlarged aperture in a pivot arm 282. One end of pivot arm 282 is screwed or otherwise secured to a pivot 284 (best seen in Fig. 8) which includes upper and lower pivot studs 286 and 288. Pivot studs 286 and 288 define the axis about which pivot arm 282 rotates. While other means may be employed to establish the pivotal axis, in the representative arrangement disclosed pivot studs 286 and 288 are retained by a bearing support 290 secured to the base plate 274. Bearing support 290 is cut away to clear the pivot member 284 and each of the upper and lower projecting portions is provided with a V-shaped notch, such as notch 292 illustrated in Fig. 7.

The upper V-notch in the bearing support 290 is provided with a pair of hardened inserts 294 and 296 against which upper pivot stud 286 abuts and a corresponding pair of inserts 298 and 300 is provided at the lower V-notch as is illustrated in Fig. 9 of the drawings. To retain the pivot studs in abutment with these inserts, upper and lower caps 302 and 304 are secured to the bearing support 290 by screws or other appropriate fastening means. As may best be seen in Fig. 7, a ball 306 is disposed in a central aperture in the upper cap 302 in a position to engage the side of the upper pivot stud 286, ball 306 being biased toward that stud by means of a spring 308 which is retained in position by a screw 310. A similar arrangement is provided in connection with the lower cap 304 so that the pivot member 284 is maintained in engagement with the V-notch bearing surfaces.

Additionally, the upper end of the upper pivot stud 286 is provided with a conical recess in which a ball 312 (Fig. 8) is seated, a downward force being exerted upon that ball by a screw 314 threadedly secured in a bracket 316 supported upon the bearing support 290. A ball 316, forced upwardly by a spring 318, engages a corresponding recess in the lower pivot stud 288 so as to accurately establish the vertical position of the pivot arm 282 and to assist in establishing a precisely located pivotal axis for that arm.

It will be appreciated that other types of hinging means may alternatively be employed.

The limits to the arcuate motion of pivot arm 282 are established by a pair of adjusting screws 320 and 322, both of which threadedly engage upstanding portions of a holdler 324 (Fig. 7). Screw 320 establishes the maximum movement to the right of pivot arm 282 during the measuring operation, whereas adjusting screw 322, manipulable by knob 326, establishes the zero or return position of the pivot arm 282. At the end of the pivot arm 282 remote from its pivotal axis is provided a hardened surface 328 adapted to engage the sensing tip 330 of a gauge G1. Gauge G1 is preferably of the same type as gauge G2 previously discussed.

To bring the pivot arm 282 to its zero position in abutment with adjusting screw 322, the movable core 334 of a solenoid S1 is coupled to the arm 282 by means of a pivotal link 338, solenoid 336 being supported upon the base plate 274 by means of a bracket 340. The energization of this solenoid will be described hereinafter in connection with the electrical circuitry.

The shaft 52 must be coupled to the pivot arm 282 in a fashion such that the successive increments of movement of the shaft 52 may be measured individually and independently even though they are cumulative, and the coupling means should permit conversion of the translational motion of the shaft 52 into rotational motion of the pivot arm 282. Additionally, the interconnection between these elements should be such that vibration will not produce malfunctioning or incorrect measurement.

The preferred solution lies in the use of a collet 344 which is a tubular member having a plurality of longitudinal slots therein to define a plurality of individual spring fingers, such as spring finger 346. Shaft 52 fits within the collet 344 with only the tips of the several spring fingers, such as spring finger 346, contacting the shaft 52. Collet 344 further includes a generally cylindrical end portion 348, the right-hand face of which (Figs. 7 and 8) is proximate the left-hand face of the pivot arm 282. A pair of small aligned apertures are drilled through the pivot arm 282 and through the collet end portion 348, and wires 350 and 352 are positioned in these aligned apertures. As may best be seen in connection with wire 350 in Fig. 7, the wires are locked to the pivot arm 282 by means such as set screws including set screw 354, and are locked to the collet end portion 348 by means such as set screws including screws 356 and 358. It will be appreciated that these wires must be sufficiently stiff to act in compression to move the pivot arm 282 and yet should be sufficiently flexible so as to produce little or no binding as a result of the rotational motion of pivot arm 282 in response to translational motion of shaft 52.

In operation, solenoid S1 is energized to move pivot arm 282 to the illustrated position in which the output signal from gauge G1 is indicative of a zero position of the slide and grinding wheel. As the slide and grinding wheel are advanced, shaft 52 is correspondingly advanced and this motion is transmitted through the tips of the several fingers of collet 344 and through the wires 350 and 352 to produce rotational motion of pivot arm 282 in a clockwise direction in the view of Fig. 7. Gauge G1 senses the change in position of the surface 328, and when this movement has reached the preselected value, as determined by the setting of the electrical elements, further motion of the slide and grinding wheel is terminated. Thereafter and preparatory to the next such cycle of movement, solenoid S1 is actuated to restore arm 282 to its illustrated position. Since shaft 52 cannot then move to the left in the view of Fig. 7, collet 344 will slide relative thereto during this restoring operation, and at each succeeding cycle of advance of the slide and grinding wheel, collet 344 will take a new purchase along the shaft 52.

Representative electrical circuits for producing the operation of the hereinbefore described elements are illustrated in Figs. 10 to 12 of the drawings, although certain of the details, such as the energization of the conveyor drive motors, have been omitted to avoid confusion in the drawings.

Referring first to Fig. 10 of the drawings, upon the closure of switch 370, appropriate alternating voltages are developed across the secondary windings of transformers TR1 and TR2 from the source of alternating voltage 372. As a result, an operating voltage exists between conductors 374 and 376 as well as between conductors 378 and 380. Upon the closure of start switch SW2, the winding of relay R1 is energized and contacts R1a, R1b, R1c and R1d are closed. The closure of contacts R1a establishes a latching circuit for relay R1 so that switch SW2 may then be released. The closure of contacts R1b establishes an alternating potential between conductor 382 and ground for a purpose hereinafter to be noted. The closure of contacts R1c and R1d completes an energizing circuit for motor M1 (Fig. 3) which produces the cyclic operation of the inspection machine 34 and which controls, through cams 110 and 112, the several limit switches LS6 to LS11 (generally designated 111 and 113 in Fig. 2) to establish the sequence of system operation. It will be appreciated that the conveyor motors may, if desired, be also controlled by relay R1 or by contactors controlled thereby.

The closure of contact R1b results in the establishment of an alternating voltage between conductor 382 (Figs. 10, 11 and 12) and ground. If switch SW8 (Fig. 11) is closed, the voltage appearing between conductor 382 and ground will be impressed upon the primary winding of transformer TR5 so that the gauging circuit associated with the inspection machine 34 (Fig. 1 to 4) will be energized.

The voltage appearing across the secondary winding of transfer TR5 is full-wave rectified by rectifier T6, filtered by network N1, and appears as a direct voltage across capacitor C10. This direct voltage is applied to the gauging circuit which is preferably of the type disclosed in my above-identified patent, the disclosure of which is hereby incorporated by reference in the present application and reference to which may be made for a more complete discussion of the operation of the equipment. In general, vacuum triode T7 and associated elements including resistor RE20, coil L3, capacitor C11, capacitor C12, variable inductor L4 and the capacitance of gauge G2 constitute an oscillatory system adapted to oscillate at a high frequency. The variable output signal appearing between point 384 and ground is rectified by twin diode T8 producing a deflection of meter M2 and the current through the right-hand portion of that tube resulting in the development of a voltage across cathode resistor RE21 which is applied as an output signal to conductor 386. The magnitude of the direct voltage between conductor 386 and ground will be determined by the diameter of the workpiece W and in the preferred arrangement, the magnitude of the positive direct voltage will vary as a direct function of the workpiece diameter, a correct workpiece producing an intermediate magnitude direct voltage.

This output signal on conductor 386 is supplied to a registering circuit illustrated in Fig. 12 of the drawings. The plate voltage for the several tubes in the registering circuit is obtained by means of a power supply including transformer TR6. Upon the closure of switch SW11, the primary winding of transformer TR6 is connected across the voltage between conductor 382 and ground. The voltage appearing across the secondary winding of transformer TR6 is rectified by rectifier T9, filtered by network N2, and appears as a direct voltage between conductor 388 and ground. This voltage is applied through resistor RE32 to the anode of triode T10, through resistor RE39 and the winding of relay R21 to the anode of thyratron T11, through resistor RE40 and the winding of relay R22 to the anode thyratron T12 and through resistor RE41 and the winding of relay R23 to the anode of thyratron T13. This supply voltage is also employed to establish a positive, direct, biasing voltage of a preselected value at the cathodes of each of the thyratrons T11, T12 and T13. The voltage on conductor 388 is applied across the circuit including resistor RE39, resistor RE42, variable resistor RE43, limit switch LS6 shunted by resistor RE44, and limit switch LS7, the cathode of thyratron T11 being connected to this voltage dividing circuit at a point intermediate resistors RE42 and RE43. Similarly, voltage dividing networks including variable resistors RE46 and RE48 control the potential at the cathodes of thyratrons T12 and T13, respectively. In the disclosed arrangement, it is assumed that the value of resistor RE48 is greater than that of resistor RE46 which is in turn greater than that of resistor RE43 so that a higher amplitude direct voltage input signal is required to fire thyratron T12 than is required to fire thyratron T11 and so that a still higher input signal is required to fire thyratron T13.

The input signal appearing between conductor 386 and ground is applied across input resistor RE30 of triode T10. The voltage appearing between the cathode of triode T10 and ground and across cathode resistor RE31 and capacitor C15 is applied as an input signal to the thyratrons T11, T12 and T13. Thus, this voltage appears across resistors RE33, RE34 and RE35 and is applied through individual resistors RE36, RE37 and RE38 to the control grids of thyratrons T11, T12 and T13, respectively.

With limit switch LS7 closed by its individual cam to enable the registering circuit thyratrons T11, T12 and T13 will register an indication of the effective size of the workpiece then being sensed relative to the nominal or correct size. If the workpiece is undersized, the voltage appearing across resistors RE31, RE33, RE34 and RE35 will be insufficient to produce the discharge of any one of the thyratrons T11, T12 and T13. If that input signal is of a higher magnitude indicative of the measurement of a workpiece of correct size, the voltage applied to the thyratrons will be adequate to fire thyratron T11 but will be inadequate to fire thyratrons T12 and T13. At a still higher input signal, indicating that the workpiece is slightly oversized but yet within tolerance, both thyratrons T11 and T12 will be fired. If the workpiece is oversized by more than the permitted amount, the input signal will be of sufficient amplitude to fire all three thyratrons T11, T12 and T13. Discharge thyratron T11 will produce operation of relay R21, discharge of thyratron T12 will produce operation of relay R22 and discharge of thyratron T13 will produce operation of relay R23.

This registration is translated into the operation of but one of four indicating relays. A relatively low amplitude alternating control voltage is established between conductor 390 and ground by applying the higher alternating voltage appearing between conductor 382 and ground across the step-down transformer TR4 (Fig. 11). During the portion of the measuring cycle in which limit switch LS9 is closed, the voltage between conductor 390 and ground is applied between conductor 392 and ground. As a result, if none of the relays R21 to R23 (Fig. 12) was operated, indicating that the workpiece is undersized, circuits exist from conductor 392 through lamp LI4, relay R24 and solenoid S4 in parallel with one another, through normally and now closed contacts R21a, R22a and R23a to ground, producing illumination of the signal lamp LI4 and energization of the signal relay R24 and of the solenoid S4. Solenoid S4 may be employed to control a segregating device for directing the undersized workpieces to an appropriate point if desired. However, as indicated, it is here assumed that the output of the machine shown in Fig. 1 is fed to a subsequent finish grind machine and it is further assumed that the undersized workpieces are finish ground and are then discarded only if they continue to be undersized after the finish grinding operation is complete.

If relay R21 is operated to indicate that the measured workpiece is of the appropriate size, contacts R21a are open so that lamp LI4, relay R24 and solenoid S4 will not be energized; however, contacts R21b will be closed so that circuits will be completed to energize lamp LI5 and relay R25, both of which indicate that the workpiece is of the correct size. If, on the other hand, the workpiece is slightly oversize but within tolerance so that relays R21 and R22 are both operated, lamp LI6 and relay R26 will be actuated to signal that fact. As will be seen, repeated actuation of relay R26 will result in the initiation of the correction cycle. If all three of the relays R21, R22 and R23 are operated in response to the mensuration of a workpiece which is oversized and beyond the prescribed tolerances, lamp LI7 is illuminated to indicate that fact, relay R27 is operated and solenoid S5 is energized. Solenoid S5 may be identical to solenoid 188 in the inspection machine disclosed in Figs. 2, 3 and 4 of the drawings.

While a correction cycle could be initiated in response to the operation of either relay R26 or R27, it is preferred that two or more successive indications of the need for a correction be received before such a cycle is initiated. Consequently, means are provided for delaying the initiation of the correction cycle in response to the operation of either relay R26 or R27 until there has been an opportunity to check the diameters of one or more further workpieces. If the subsequent measurements verify that correction is required, the correction cycle is permitted to proceed.

To accomplish these functions, a resistance-capacitance timing circuit is provided including resistor RE50 and capacitor C18 connected in series with one another and across the source of voltage between conductor 388 and ground. Resistor RE50 is variable to control the number of oversized indications which is required to initiate correction.

Under appropriate conditions, capacitor C18 charges over the previously traced circuit, the voltage thereacross increasing at an exponential rate. This voltage is applied through resistor RE52 to the control grid of thyratron T15 to fire that thyratron when the voltages reaches a critical magnitude. However, the timing circuit including resistor RE50 and capacitor C18 is disabled to establish a voltage at the grid of thyratron T15 adequate to fire that thyratron if resistor RE51 is effectively connected in shunt of capacitor C18, a condition which will exist if relay R1 is released or if limit switch LS4 is closed, or if, in combination, both relays R26 and R27 are released and limit switch LS8 is closed.

Limit switch LS4 is open except for a short period during the correction cycle and since such a correction cycle has not yet been initiated, limit switch LS4 is not now closed. Additionally, relay R1 (Fig. 10) is operated at any time that the equipment is functioning, as before noted, so that contacts R1e (Fig. 12) are open. Therefore, if the measured workpiece was oversized either within the established limit, in which case relay R26 is operated, or above the established limit, in which case relay R27 is operated, contacts R26a or R27a are open so that the timing circuit is enabled and capacitor C18 can charge even though limit switch LS8 is normally closed.

At a point in the measuring cycle after the measurement is complete and after the workpiece has been blown from the inspection machine over a route determined by the condition of solenoid S5, limit switches LS6 and LS7 are tripped to extinguish any of the thyratrons T11 to T13 which have been fired, thereby to release the corresponding relay or relays R21 to R23, and limit switch LS9 is momentarily opened to release the registration from the previous measurement by releasing any of the relays R24 to R27 and solenoids S4 and S5 which have been operated.

Limit switch LS8, connected in series with contacts R26a and R27a, is cammed open prior to the opening of limit switch LS9 to prevent capacitor C18 from being automatically discharged each measuring cycle regardless of the result of the measurement. After the next measurement has occurred, limit switch LS8 is permitted to reclose so that the then condition of contacts R26a and R27a will be permitted to determine and control the charging of capacitor C18. If, with the assumed setting of variable resistor RE50 and variable resistor RE55, two successive workpieces produce the operation of relay R26 or R27, the voltage across capacitor C18 reaches an adequate value to produce firing of thyratron T15 and operation of relay R30. The operation of relay R30 signals the initiation of the correction cycle.

The operation of relay R30 and the resultant closure of contacts R30a results in the operation of relay R3 (Fig. 10), and the resultant closure of contacts R3a results in energization of timing motor M3. Motor M3 drives a group of cams (not shown) which cooperate with limit switches LS1 to LS5 to control the operations of the equipment during the correction cycle. It should be appreciated that motor M1 is a relatively low-speed unit, such as a gear motor, and may require one half of a minute to a minute to produce one cycle of operation, that is, to produce one correction cycle. The length of the correction cycle will, of course, be determined by a number of factors, including the time required for the incremental movement of the grinder to be reflected in modification of the diameters of gauged workpieces.

Immediately motor M3 commences to rotate, limit switch LS1 is cammed closed, establishing a continuing energizing path for motor M3. Limit switch LS1 is permitted to open at the end of one revolution of the cams so as to terminate operation of motor M3. Additionally, limit switches LS4 and LS5 (Fig. 12) are also tripped during a portion of this correction cycle, limit switch LS4 being closed to insure that capacitor C18 is discharged and limit switch LS5 being opened to insure that thyratron T15 is extinguished. When this occurs, of course, relay R30 releases, releasing relay R3 (Fig. 10) and opening contacts R3a so that motor M3 is energized exclusively through limit switch LS1.

Shortly after motor M3 is energized, it produces the closure of limit switch LS3 (Fig. 10) and a resultant operation of relay R5. Relay R5 locks operated through its own normally open contacts R5a and through a normally and now closed contact R9b, limit switch LS3 being opened shortly after its closure to place relay R9 in control of the continuing operation of relay R5. The closure of contacts R5b and R5c coupled with the earlier closure of contacts R1c and R1d completes an energizing circuit for motor M2 which is a part of the indexing mechanism disclosed in Figs. 5 and 6 of the drawings and is the motor which drives the belt which engages pulley 202 in those figures. As a result, tapping commences and the slide of the grinder commences to advance. The resonator assembly, to be described, may be energized concurrently with the energization of motor M2.

The energization of motor M2 also results in the momentary closure of limit switch LS2 and a momentary operation of relay R4 which controls, through its contacts R4a and R4b, solenoid S1. Solenoid S1 is a part of the correction control equipment illustrated in Figs. 2, 3 and 4 of the drawings, and the momentary energization thereof produces a resetting of that correction control equipment in preparation for the measurement of the extent of advance of the slide of the grinder.

The movement of the grinder slide or bed is, as above noted, continuously measured by gauge G1 (Fig. 10). The gauging circuit is similar to that described in my above-noted patent and similar to that associated with gauge G2 (Fig. 11). With switch SW5 closed, the voltage between conductor 382 and ground is impressed across the primary winding of transformer TR3 and the resultant secondary voltage is rectified by rectifier T1, filtered by a network including resistors RE1 and RE2 and capacitors C1, C2 and C3, and the resulting direct voltage is applied to the center tap of coil L1. The circuit including triode T2 oscillates at a frequency determined by the capacitance of gauge G1. Direct currents of magnitudes varying in accordance with the instant setting of gauge G1 flow through meter M1 and resistor RE9 as a result of rectification by double diode T3 and the resultant voltage drop across resistor RE9 is applied through resistor RE10 and across resistor RE11. The voltage across resistor RE11 is applied through resistor RE12 to the control grid of thyratron T5.

In order to provide operating potentials for thyratron T5, the direct voltage appearing across filter capacitors C2 and C3 and bleeder resistor RE2 is applied across the network including resistors RE4, RE5 and RE13, contacts R4c being closed during the measuring period. The voltage between the junction of resistors RE4 and RE5 and ground is regulated by a voltage regulating gas diode T4, and the anode of thyratron T5 is connected to this point of regulated voltage through the winding of relay R6.

The voltage which must be applied to the control grid of thyratron T5 to produce firing thereof is determined by the adjustment of resistor RE13, and that adjustment may be employed to establish the preselected distance through which the bed or slide of the grinder will be moved during any one correction cycle.

When thyratron T5 fires, relay R6 is operated. Relay R6, in operating, closes its contacts R6a to complete a circuit from the alternating voltage on conductor 390 through resistor RE16 and lamp LI1 to signal the completion of the correction cycle and to also complete a circuit from the voltage on conductor 390 through the winding of relay R9 to produce operation of that relay. Relay R9, in operating, opens its contacts R9b to interrupt the locking circuit for relay R5 whereupon relay R5 releases, opening its contacts R5a, R5b and R5c. As a result, motor M2 is deenergized so that the indexing or tapping immediately terminates, the bed of the grinder having been advanced the correct, preselected amount. Motor M3 will continue to run for the remainder of its full revolution, that is, until limit switch LS1 is opened. It will be observed that if for any reason the bed of the grinder has not moved forwardly the preselected increment within the period of one correction cycle, the mechanism then recycles to continue the advance of the bed of the grinder.

It will be appreciated that the inspection machine continues to operate throughout this correction cycle, the registration circuit of Fig. 12 continuing to function to control solenoids S4 and S5 so as to control the destination of the excessively gauged workpieces. However, the operation of relay R26 or R27 will not affect the operation of the correction equipment.

As before indicated, the indexing mechanism 44 (Fig. 1) is designed to advance the slide 24 in minute increments. The smoothness of that advance can be improved through the use of the resonator assembly schematically illustrated in Fig. 13 of the drawings. That assembly serves to vibrate the slide relative to the remainder of the machine so as to tend to reduce the effects of static friction.

While primarily mechanical vibratory means can be employed, the disclosed arrangement has been found to produce superior results. In the preferred arrangement, two electro-mechanical transducers 400 and 416 are secured, at spaced-apart points, to the slide 24. While the locations are not critical, the disposition of the two units on opposite vertical sides of the slide has proved satisfactory.

Transducer 400 is an input or pick-up unit adapted to produce an electrical signal on conductors 406–408 which varies in accordance with the vibrations of the slide 24. In practice, transducer 400 can take the form of a commercially available microphone tightly secured to the slide 24 by means of a bracket 402 mounted upon the slide 24 by machine screws 404.

The electrical signal on conductors 406–408 is applied to the input terminals of an audio-frequency amplifier 410. Units having power ratings in the order of thirty to fifty watts have proved satisfactory in practice.

The output conductors 412–414 of amplifier 410 are connected to an output transducer 416 which is attached to slide 24 by means such as screws 418. Unit 416 can take the form of a conventional diaphragm-type loudspeaker having its frame secured to the slide 24, or a plurality of such units. A satisfactory unit can be patterned after a conventional ear phone and including a pot-type magnet structure and a flat metallic diaphragm. A constructed unit embodied a metallic diaphragm approximately six inches in diameter.

It will be appreciated that the system illustrated in Fig. 13 constitutes a regenerative feed-back system, the entire system tending to electrically and mechanically oscillate at one or more frequencies determined by the system parameters. Any vibration of the slide 24 is picked up by transducer 400, converted into an electrical signal thereby, amplified by amplifier 410, applied to transducer 416, and converted into mechanical vibrations of slide 24. It appears that the system tends to oscillate primarily at a frequency which is a harmonic of the natural frequency of mechanical vibration of the slide 24 and parts moving therewith. The electrical wave form is complex, evidencing the presence of signals of a plurality of frequencies. The major component of the signals in a constructed arrangement appeared to be of a frequency in the range of two thousand to four thousand cycles per second.

It will be appreciated that the magnitude of the vibrational movement of the slide 24 relative to its ways is exceedingly small, any relative movement at all tending to be adequate to reduce the static friction to a satisfactory value.

The fact that the slide is being vibrated is not detectable, in practice, in the finished workpieces and it appears that the vibrational magnitude is so low that it is not transmitted through the bearings which support the grinding wheel upon the slide.

The vibration of the slide, if resonator 24 is employed, does tend to be transmitted to the slide-position sensing mechanism 54 (Fig. 1) including gauge G1 (Figs. 7 to 9) but these low-amplitude signals can be appropriately integrated and compensated for by means, for example, of a suitable capacitor in the gauging circuit, such as the capacitor illustrated in Fig. 10 of the drawings connected in shunt of cathode resistor RE9.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a machine having a cutting surface for removing material from workpieces to reduce a dimension of the workpieces to a preselected valve and having positioning means for establishing the relationship between the cutting surface and the workpieces, the combination of driving means for moving said positioning means, measuring means for measuring the said dimension of the workpieces, means controlled by said measuring means for initiating operation of said driving means, sensing means for sensing the position of said positioning means, and means controlled by said sensing means for terminating the operation of said driving means.

2. In a machine having a cutting surface for removing material from workpieces to reduce the dimension of the workpieces to a preselected value and having positioning means for establishing the relationship between the cutting surface and the workpieces, the combination of driving means for moving said positioning means, measuring means for measuring the said dimension of the workpieces, means controlled by said measuring means for initiating operation of said driving means, sensing means for sensing the position of said positioning means, and means controlled by said sensing means and effective when said positioning means has been moved a preselected distance for terminating the operation of said driving means.

3. In a machine having a cutting surface for removing material from workpieces to reduce the dimension of the workpieces to a preselected value and having positioning means for establishing the relationship between the cutting surface and the workpieces, the combination of driving means for moving said positioning means, measuring means for measuring the said dimension of the workpieces, means controlled by said measuring means and effective when said dimension varies from said preselected value by more than a preselected amount for initiating operation of said driving means, sensing means for sensing the position of said positioning means, and means controlled by said sensing means and effective when said positioning means has been moved a preselected distance for terminating the operation of said driving means.

4. In a machine having a cutting surface for removing the material from workpieces to reduce the dimension of the workpieces to a preselected value and having positioning means for establishing the relationship between the cutting surface and the workpieces, the combination of driving means for moving said positioning means, measuring means for measuring the said dimension of the workpieces, means controlled by said measuring means and effective when said dimension varies from said preselected value by more than a preselected amount on each of a plurality of successive measured workpieces for initiating operation of said driving means, sensing means for sensing the position of said positioning means, and means controlled by said sensing means and effective when said positioning means has been moved a preselected distance for terminating the operation of said driving means.

5. In a machine having a movable member for moving a slide relative to a base, the combination of a source of mechanical power, slip clutch means for coupling said source to said member for exerting a force on said member of insufficient magnitude to move said member, and means including said source for intermittently applying additional forces to said member.

6. In a machine having a movable member for moving a slide relative to a base, the combination of a source of mechanical power, slip clutch means for coupling said source to said member for exerting a relatively steady force on said member of insufficient magnitude to move said member, and means including said source for intermittently applying additional forces to said member, said additional forces being of sufficient magnitude in combination with said steady force to produce incremental movement of the slide relative to the base.

7. In a machine having a rotatable member for moving a slide relative to a base, the combination of a rotatable shaft connected to said member, and means for applying a series of impact forces to said shaft tending to rotate said shaft comprising a plate supported by said shaft, an anvil on said plate, a hammer engageable with said anvil, driving means for repetitively moving said hammer away from engagement with said anvil, and spring means repetitively energized by said driving means for repetitively forcing said hammer into impact engagement with said anvil.

8. In a machine having a rotatable member for moving a slide relative to a base, the combination of a rotatable shaft connected to said member, and means for applying a series of impact forces to said shaft tending to rotate said shaft comprising a plate supported by said shaft, an anvil on said plate, a hammer rotatably supported relative to said shaft, driving means for periodically rotating said hammer relative to said shaft for moving said hammer periodically away from said anvil, and spring means periodically energized by said driving means for periodically forcing said hammer into impact engagement with said anvil.

9. In a machine having a rotatable member for moving a slide relative to a base, the combination of a shaft connected to said member, a plate supported by said shaft, an anvil on said plate, a hammer rotatably supported relative to said shaft, and means for periodically rotating said hammer relative to said shaft for causing said hammer periodically to strike and apply impact forces to said anvil comprising spring means tending to rotate said hammer in a direction toward said anvil, a cam for rotating said hammer in a direction away from said anvil, and means for periodically moving said cam into engagement with said hammer.

10. In a machine having a rotatable member for moving a slide relative to a base, the combination of a shaft connected to said member, a source of mechanical power, a slip clutch coupling said source to said shaft, a plate supported by said shaft, an anvil on said plate, a hammer engageable with said anvil, and means for repetitively bringing said hammer into engagement with said anvil.

11. In a machine having a movable member for moving a slide relative to a base, the combination of means for applying to said member a relatively steady force of insufficient magnitude to move said member, means for applying a periodically varying force to said member, said periodically varying force being of sufficient magnitude in combination with said steady force to produce incremental movement of said slide relative to said base, and means for vibrating said slide concurrently with the application of said forces to said member.

12. In a machine having a movable member for moving a slide relative to a base, means for vibrating said slide comprising a transducer for converting vibrations of said slide to electrical signals, means for amplifying said signals, and a transducer for converting said amplified signals into mechanical vibration of said slide.

13. In a machine having a movable member for moving a slide relative to a base, an audio-frequency amplifier, an input transducer connected to said amplifier, an output transducer connected to said amplifier, and an accoustic feed-back loop including said transducers and said slide.

14. In a machine having a movable member for moving a slide relative to a base, an audio-frequency amplifier having an input and an output, a microphone secured to said slide at one point to sense vibrations of said slide and connected to said input, and an electro-mechanical transducer electrically connected to said output and mechanically connected to said slide at a point remote from said one point.

15. In a machine having a movable member for moving a slide relative to a base, the combination of means for applying a relatively steady force to said member, means for applying a periodically varying force to said member, and means for vibrating said slide concurrently with the application of said forces to said member comprising an audio-frequency amplifier having an input and an output, a microphone secured to said slide at one point to sense vibrations of said slide and connected to said input, and an electro-mechanical transducer electrically connected to said output and mechanically connected to said slide at a point remote from said one point.

16. In a machine having a movable member for moving a slide relative to a base, a rod secured to and movable with said slide relative to said base, a gauge mechanism supported by said base, and slip clutch means interconnecting said rod and said gauge mechanism.

17. In a machine having a movable member for moving a slide relative to a base, a rod element secured to and movable with said slide relative to said base, a gauge mechanism supported by said base and including a movable element, and clutch means interconnecting said elements, said clutch means slipping whenever the force applied by either of said elements upon the other exceeds a preselected amount.

18. In a machine having a movable member for moving a slide relative to a base, a rod secured to and movable with said slide relative to said base, a gauge mechanism supported by said base, clutch means interconnecting said rod and said gauge mechanism responsive to movement of said rod in one direction to move a portion of said gauge mechanism in said one direction, and resetting means for moving said portion of said gauge mechanism in the opposite direction, said clutch means slipping during the operation of said resetting means.

19. In a machine having a movable member for moving a slide relative to a base, a rod secured to and movable with said slide relative to said base, a gauge mechanism comprising a pivotally mounted plate having an enlarged aperture through which said rod freely passes, and slip clutch means interconnecting said rod and said plate.

20. In a machine having a movable member for moving a slide relative to a base, a rod secured to and movable with said slide relative to said base, a gauge mechanism comprising a pivotally mounted plate having an enlarged aperture through which said rod freely passes, and clutch means interconnecting said rod and said plate comprising a collet including a plurality of spring fingers frictionally engaging said rod, and means connecting said collet to said plate.

21. In a machine having a movable member for moving a slide relative to a base, a rod secured to and movable with said slide relative to said base, a gauge mechanism comprising a pivotally mounted plate having an enlarged aperture through which said rod freely passes, and clutch means interconnecting said rod and said plate comprising a collet including a plurality of spring fingers frictionally engaging said rod, and means connecting said collet to said plate comprising a wire secured to and extending between said collet and said plate.

References Cited in the file of this patent
UNITED STATES PATENTS

| | | |
|---|---|---|
| 2,033,922 | Cole | Mar. 17, 1936 |
| 2,049,611 | Harrison et al. | Aug. 4, 1936 |
| 2,746,813 | Massa | May 22, 1956 |
| 2,812,623 | Messerschmidt | Nov. 12, 1957 |